United States Patent [19]
Nozaki

[11] Patent Number: 5,637,632
[45] Date of Patent: Jun. 10, 1997

[54] FIRE-RESISTANT POLYAMIDE RESIN COMPOSITION

[75] Inventor: Masahiro Nozaki, Tochigi, Japan

[73] Assignee: E. I. Du Pont de Nemours and Company, Wilmington, Del.

[21] Appl. No.: 464,621

[22] PCT Filed: Dec. 28, 1993

[86] PCT No.: PCT/US93/12594

§ 371 Date: Jun. 26, 1995

§ 102(e) Date: Jun. 26, 1995

[87] PCT Pub. No.: WO94/14884

PCT Pub. Date: Jul. 7, 1994

[30] Foreign Application Priority Data

Dec. 28, 1992 [JP] Japan ................................ 4-347911
Mar. 30, 1993 [JP] Japan ................................ 5-071566

[51] Int. Cl.$^6$ ................................ C08J 5/10; C08K 5/34; C08L 77/00
[52] U.S. Cl. ................................ 524/100; 524/99; 524/101; 524/210; 524/230; 524/313
[58] Field of Search ................................ 524/99, 100, 101, 524/210, 230, 313

[56] References Cited

U.S. PATENT DOCUMENTS

| | | | |
|---|---|---|---|
| 2,948,698 | 8/1960 | Cocci | 60/32.6 |
| 3,361,701 | 1/1968 | Polack et al. | 260/32.6 |
| 4,321,189 | 3/1982 | Ohshita et al. | 524/101 |
| 4,511,684 | 4/1985 | Schmid et al. | 524/101 |
| 4,749,736 | 6/1988 | Khanna et al. | 524/230 |

FOREIGN PATENT DOCUMENTS

| | | |
|---|---|---|
| 53-31759 | 3/1978 | Japan . |
| 56-21065 | 5/1981 | Japan . |
| 58-27744 | 2/1983 | Japan . |
| 59-140268 | 8/1984 | Japan . |
| 62-54736 | 3/1987 | Japan . |
| 62-257943 | 11/1987 | Japan . |
| 89-38820 | 8/1989 | Japan . |

OTHER PUBLICATIONS

PCT/US93/12594—International Search Report dated Dec. 28, 1993.

*Primary Examiner*—Paul R. Michl
*Assistant Examiner*—U. K. Rajguru

[57] ABSTRACT

This invention relates to a fire-resistant polyamide resin composition comprising 3 to 30 weight percent melamine cyanurate and 0.02 to 1 weight % of an amide compound or a fatty acid glyceride compound or a combination of said amide and glyceride compound.

3 Claims, No Drawings

FIRE-RESISTANT POLYAMIDE RESIN COMPOSITION

BACKGROUND OF THE INVENTION

The present invention pertains to a fire-resistant polyamide composition that shows improved molding fluidity and superior tensile modulus and Izod impact strength.

Polyamide resins are used in a variety of fields, such as electrical and electronic parts, etc., due to their superior mechanical properties, electrical properties, chemical resistance, etc. However, since superior fire resistance is needed in certain fields, research is being performed in order to obtain polyamide resins with superior fire resistance when compared to conventional resins. Moreover, methods whereby a variety of flame retarders, such as halogen compounds, phosphorous compounds, etc., are mixed in order to obtain fire-resistant polyamide resin compositions have been used in the past. In particular, polyamide resin compositions in which melamine cyanurate has been added as the flame retarder are known to provide molded articles that show no generation of toxic components with pyrolysis [Japanese Kokai Patent No. Sho 53(1978)-31759].

Moreover, research is also being performed on improvement of molding fluidity of fire-resistant polyamide resin compositions in order to obtain molded articles of complex shapes, as well as molded articles having thin walls. Although polyamide resins with a low molecular weight, i.e., a low viscosity, can be used to improve molding fluidity, the superior mechanical properties of the polyamide resin itself cannot be retained when polyamide resins with a low molecular weight are used. Therefore, fire-resistant polyamide resin compositions to which bisamides and stearic acid stearates have been added are being developed in order to retain mechanical properties while improving fluidity [Japanese Patents No. Sho 56(1981)-21065 and No. Hei 1(1989)-38820]. Nevertheless, molding conditions are restrictive and it is difficult to obtain good molded articles under a wide range of molding conditions with these fire-resistant polyamide resin compositions containing bisamides and stearic acid stearates. Consequently, there is a demand for further improvement of molding fluidity of fire-resistant polyamide resin compositions.

In light of the aforementioned circumstances, the purpose of this invention is to present a fire-resistant polyamide resin composition with improved molding fluidity. As a result, molded articles of a complex shapes and thin molded articles having superior tensile modulus and Izod impact strength can be obtained under a wide range of molding conditions.

SUMMARY OF THE INVENTION

This invention relates to a fire-resistant polyamide resin composition comprising polyamide resin, 3 to 30 wt % melamine cyanurate and 0.02 to 1 wt % of at least one amide compound represented by the following formula.

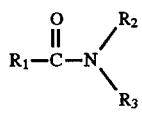
(I)

wherein $R_1$ is an aliphatic hydrocarbon and $R_2$ and $R_3$ are hydrogen or an aliphatic hydrocarbon.

This invention also relates to a fire-resistant polyamide resin composition comprising polyamide resin, 3 wt % to 30 wt % melamine cyanurate, and 0.02 to 1 wt % of at least one fatty acid glyceride compound represented by the following formula:

(II)

wherein at least one of $R_4$, $R_5$ and $R_6$ is an aliphatic carbonyl group and the others are hydrogen or an aliphatic carbonyl group.

Furthermore, this invention relates to a fire-resistant polyamide resin composition comprising polyamide resin, 3 to 30 wt % melamine cyanurate, and a total of 0.02 to 1 wt % of at least one amide compound represented by the aforementioned formula (I) and at least one fatty acid glyceride compound represented by aforementioned formula (II).

DETAILED DESCRIPTION OF THE INVENTION

Examples of polyamide resins which may be used in this invention include copolymers obtained by polycondensation of a diamine such as hexamethylene diamine, etc., and a dicarboxylic acid, such a terephthalic acid, isophthalic acid, adipic acid, etc., and polymers and copolymers of ε-caprolactam, aminocaproic acid, enantholactam, 7-aminoheptanoic acid, pyrrolidone, etc.

The melamine cyanurate used in this invention is an equimolar reaction product of cyanuric acid and melamine and can be obtained by, for instance, mixing an aqueous solution of cyanuric acid and an aqueous solution of melamine and reacting the mixture while it is being stirred at a temperature of 90° to 100° C., after which the precipitate that is produced is filtered. The melamine cyanurate is generally a white solid. It should be used as a micropowder. Commercial powder can be used as is or after being crushed. Additionally, some of the amino groups or hydroxyl groups of the melamine cyanurate used in this invention can be substituted with other substituents. A compound substituted in this way can be used in this invention as long as it is a melamine cyanurate.

In this invention there should be 3 to 30 wt % of the melamine cyanurate. When less than this amount is used, fire-proofing effects cannot be expected, while when more than this amount is used, detrimental and undesirable effects on mechanical properties are noticed.

The amide compound used in this invention should be at least one selected from those shown in the aforementioned general formula (1). Examples include lauryl amide, stearyl amide, behenyl amide, N,N-diethyl stearyl amide, N,N-diethyl behenyl amide, etc.

The fatty acid glyceride compound used in this invention should be one or two or more selected from those shown by aforementioned general formula (II). Examples include monoesters, diesters, or triesters of saturated or unsaturated fatty acids, such as behenic acid, stearic acid, lauric acid, erucic acid, etc., of glycerin. Fatty acid glyceride compounds with 10 or more carbons are preferred.

Although the amide compounds and fatty acid glyceride compounds can be used alone, it is preferred that they be used together.

The amount of these amide compounds and fatty acid glyceride compounds added is 0.02 to 1 wt %, preferably 0.05 to 0.5 wt %, whether they are used alone or together. When less than this amount is used, improvement of molding fluidity of the resin composition cannot be expected, while when more than this amount is used, mold deposition plate out readily occur. Additionally, when the amount of these amide compounds and fatty acid glyceride compounds exceeds the specified upper limit, problems with injection molding and molded article quality are observed.

The fire-resistant polyamide resin composition of this invention retains sufficient fire resistance, while showing improved molding fluidity, due to the multiplied effects of the aforementioned melamine cyanurate and amide compound and/or fatty acid glyceride compound. That is, this invention provides a resin composition that shows reduced melt viscosity and improved molding fluidity because a polyamide resin with a low molecular weight is not used and because the composition contains an amide compound and/or fatty acid glyceride compound. Consequently, when the fire-resistant resin composition of this invention is used, thermal stability can be improved because generation of heat with shearing during injection molding is inhibited. Moreover, the formation of silver on the surface of the injection molded article is thereby prevented and as a result, molded articles with a good appearance can be obtained under a wide range of molding conditions.

By means of this invention, molding fluidity of the resin composition can be improved without using a polyamide resin with a low molecular weight and therefore, the properties of the polyamide resin itself can be retained while improving thermal stability and inhibiting thermal degradation of the resin. As a result, tensile modulus and Izod impact strength are improved when compared to conventional molded articles to which bisamides and stearic acid stearates have been added. Consequently, the fire-resistant polyamide resin composition of this invention is preferred for uses such as electrical and electronic parts, etc.

There are no special restrictions to the method by which the composition of this invention is obtained. Useful methods include methods whereby each component is dry blended together, methods whereby after the melamine cyanurate and amide compound and/or fatty acid glyceride compound have been premixed, polyamide resin is added to this mixture, etc.

Additionally, the composition of this invention can also contain conventional additives, such as dyes, pigments, fillers, antistatics, inorganic reinforcers, etc., as long as it is within a range that does not preclude attainment of the aforementioned purpose.

EXAMPLES

This invention is further illustrated by the examples below. This invention, however, is not limited to the examples.

Examples 1 Through 9 and Comparative Examples 1 Through 4

Melamine cyanurate (Mitsubishi Yuka; MCA C-0) and the amide compounds and/or fatty acid glyceride compounds shown in Table 1 were mixed with nylon 66 pellets (DuPont; Zytel® 101) with the relative viscosity (formic acid method) shown in Table 1. The additives that were used were N-stearyl erucamide ($C_{21}H_{43}CONHC_{18}H_{37}$), ethylene bis-stearylamide ($C_{17}H_{36}CONHCH_2CH_2NHCOC_{17}H_{35}$), behenic acid monoglyceride ($C_{21}H_{43}COOC_3H_6(OH)_2$), and stearyl stearate ($C_{17}H_{35}COOC_{18}H_{37}$). The melting temperature at a resin temperature of 285° C. was determined for each mixture using a rheometer made by Kaines.

Pellets were then prepared. Tensile test pieces, impact test pieces and UL94 burning test pieces were molded using these pellets. Tensile tests, impact tests and burning tests were performed using these pieces. Moreover, retention time until silver formed was determined on a plate measuring 76.2×127×3.2 mm at a resin temperature of 285° C. The test methods used were as follows:

| Tensile test (tensile modulus) | ASTM D638 |
| Impact test (Izod impact strength) | ASTM D256 |
| Burning test (using test piece with thickness of 1/32 inch [approximately 0.8 mm] | UL 94 |

The test results are shown in Table 1.

TABLE 1

| | Examples | | | | | | | | | Comparative Examples | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Nylon 6.5, relative viscosity of 43 (wt %) | 94.95 | 94.5 | 94.0 | 91.5 | 94.95 | 94.5 | 94.0 | 91.5 | 94.5 | | 95 | 94.5 | 94.5 |
| Nylon 6.6, relative viscosity of 37 (wt %) | | | | | | | | | | 95 | | | |
| Melamine cyanurate (wt %) | 5 | 5 | 5 | 8 | 5 | 5 | 5 | 8 | 5 | 5 | 5 | 5 | 5 |
| N-stearyl erucamide (wt %) | 0.05 | 0.5 | 1.0 | 0.5 | | | | | 0.25 | | | | |
| Ethylene bis-steamylamide (wt %) | | | | | | | | | | | | 0.5 | |
| Behenic acid monoglyceride (wt %) | | | | | 0.05 | 0.5 | 1.0 | 0.5 | 0.25 | | | | |
| Stearyl stearate (wt %) | | | | | | | | | | | | | 0.5 |
| Melt viscosity (1/1000 sec) | 52 | 50 | 47 | 50 | 53 | 53 | 50 | 52 | 40 | 42 | 67 | 60 | 62 |
| Modulus (%) | 19.0 | 21.4 | 18.6 | 15.0 | 16.0 | 19.5 | 16.5 | 15.0 | 23.0 | 7.0 | 10.0 | 11.5 | 11.0 |
| Izod value (kg cm/cm) | 4.50 | 4.45 | 4.40 | 4.50 | 4.65 | 4.50 | 4.45 | 4.45 | 4.82 | 3.10 | 3.45 | 3.55 | 3.25 |
| Combustibility (1/32") | V-0 | V-0 | V-0 | V-0 | V-0 | V-0 | V-0 | V-0 | V-0 | V-0 | V-0 | V-0 | V-0 |
| Retention time until silver formed | | 5 | | | | 5 | | | 7 | | <4 | <4 | <4 |

In Examples 1 through 9 of this invention, melt viscosity was lower and tensile modulus was improved by approximately two-fold while Izod impact was improved by 1.2-fold or more as compared to the compositions in Comparative Examples 1 through 4.

I claim:

1. A fire-resistant polyamide resin composition comprising polyamide resin, based on the total weight of said composition, 3 to 30 weight percent melamine cyanurate, said cyanurate being an equimolar reaction product of cyanuric acid and melamine, and 0.02 to 1 weight % of an amide compound represented by the following formula:

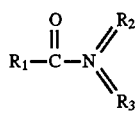

(I)

wherein $R_1$ is an aliphatic hydrocarbon and $R_2$ and $R_3$ are hydrogen or an aliphatic hydrocarbon.

2. A fire-resistant polyamide resin composition comprising polyamide resin, based on the total weight of said composition, 3 to 30 weight percent melamine cyanurate, said cyanurate being an equimolar reaction product of cyanuric acid and melamine, and 0.02 to 1 wt % of at least one fatty acid glyceride compound represented by the following formula:

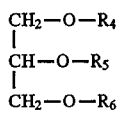

(II)

wherein at least one of $R_4$, $R_5$ and $R_6$ is an aliphatic carbonyl group and the others are hydrogen or an aliphatic carbonyl group.

3. A fire-resistant polyamide resin composition comprising polyamide resin, based on the total weight of said composition, 3 to 30 weight percent melamine cyanurate, said cyanurate being an equimolar reaction product of cyanuric acid and melamine, and a total of 0.02 to 1 wt % of at least one amide compound represented by the following formula (I):

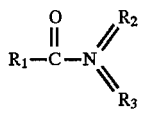

(I)

wherein $R_1$ is an aliphatic hydrocarbon and $R_2$ and $R_3$ are hydrogen or an aliphatic hydrocarbon and at least one fatty acid glyceride compound represented by the following formula (II):

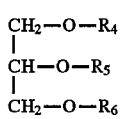

(II)

wherein at least one of $R_4$, $R_5$ and $R_6$ is an aliphatic carbonyl group and the others are hydrogen or an aliphatic carbonyl group.

\* \* \* \* \*